(12) United States Patent
Velasco et al.

(10) Patent No.: US 9,580,175 B2
(45) Date of Patent: Feb. 28, 2017

(54) AIRCRAFT SEAT BACK ASSEMBLY

(71) Applicants: Howard Velasco, Bristol, CT (US); Bruce Swomley, Litchfield, CT (US)

(72) Inventors: Howard Velasco, Bristol, CT (US); Bruce Swomley, Litchfield, CT (US)

(73) Assignee: Franklin Products, Inc., Torrington, CT (US)

( * ) Notice: Subject to any disclaimer, the term of this patent is extended or adjusted under 35 U.S.C. 154(b) by 86 days.

(21) Appl. No.: 14/244,524

(22) Filed: Apr. 3, 2014

(65) Prior Publication Data

US 2014/0300171 A1  Oct. 9, 2014

Related U.S. Application Data

(60) Provisional application No. 61/808,337, filed on Apr. 4, 2013.

(51) Int. Cl.
| | | |
|---|---|---|
| *A47C 5/06* | (2006.01) | |
| *B64D 11/06* | (2006.01) | |
| *A47C 7/40* | (2006.01) | |
| *A47C 7/28* | (2006.01) | |
| *A47C 31/02* | (2006.01) | |

(52) U.S. Cl.
CPC ............... *B64D 11/06* (2013.01); *A47C 5/06* (2013.01); *A47C 7/282* (2013.01); *A47C 7/40* (2013.01); *B64D 11/0647* (2014.12); *B64D 11/0649* (2014.12); *A47C 31/023* (2013.01); *Y02T 50/46* (2013.01)

(58) Field of Classification Search
CPC ............................... A47C 31/023; A47C 7/282
USPC ........... 297/452.56, 452.57, 452.33, 452.34, 297/452.36, 218.1–218.5; 160/371–381
See application file for complete search history.

(56) References Cited

U.S. PATENT DOCUMENTS

| | | | | |
|---|---|---|---|---|
| 662,647 | A * | 11/1900 | Howe | E06B 7/32 160/179 |
| 3,140,086 | A * | 7/1964 | Lawson | A47C 7/20 267/111 |
| 3,298,743 | A * | 1/1967 | Albinson | A47C 7/185 297/218.5 |
| 3,300,251 | A * | 1/1967 | Helms | A47C 3/12 297/218.5 |
| 4,062,590 | A | 12/1977 | Polsky et al. | |

(Continued)

FOREIGN PATENT DOCUMENTS

| | | |
|---|---|---|
| KR | 20120050922 A | 5/2012 |
| WO | 2008020173 A2 | 2/2008 |

OTHER PUBLICATIONS

International Search Report for PCT/US2014/032952 dated Sep. 17, 2014.

(Continued)

*Primary Examiner* — Syed A Islam (74) *Attorney, Agent, or Firm* — McCormick, Paulding & Huber LLP (57) ABSTRACT

The seat back portion of a passenger aircraft seat is built of an elastomer mesh type diaphragm without conventional cushions or dress covers, in order to maximize space available to the passenger while reducing costs and weight. The diaphragm is attached and tensioned into a structural frame, which also supports a slide-in rear shroud closeout. The frame is designed to remain exposed, showing a decorative finish.

18 Claims, 6 Drawing Sheets

(56) References Cited

U.S. PATENT DOCUMENTS

| | | | |
|---|---|---|---|
| 4,510,634 A | 4/1985 | Diedrich et al. | |
| 4,846,341 A | 7/1989 | Lieb | |
| 5,076,162 A | 12/1991 | Goin | |
| 5,520,623 A | 5/1996 | Williams | |
| 5,762,403 A | 6/1998 | Robinson | |
| 6,254,190 B1 * | 7/2001 | Gregory | A47C 5/06 297/440.11 |
| 6,256,813 B1 | 7/2001 | Aaron | |
| 6,478,381 B1 * | 11/2002 | Cramb, III | B60N 2/48 297/440.11 |
| 6,802,568 B1 | 10/2004 | Johnson | |
| 7,066,537 B2 | 6/2006 | Coffield et al. | |
| 7,216,768 B2 | 5/2007 | Fisher et al. | |
| 7,267,408 B2 * | 9/2007 | Xiang | A47C 5/02 144/333 |
| 7,425,040 B1 * | 9/2008 | Honma | B60N 2/5825 297/452.57 |
| 7,669,925 B2 | 3/2010 | Beck et al. | |
| 7,837,272 B2 * | 11/2010 | Masunaga | A47C 7/282 297/218.1 |
| 8,015,748 B2 | 9/2011 | Teo | |
| 8,029,066 B2 * | 10/2011 | Su | A47C 7/40 297/440.11 |
| 8,109,576 B2 * | 2/2012 | Lin | A47C 7/282 297/452.13 |
| 8,616,655 B2 * | 12/2013 | Jung | A47C 7/282 297/452.56 |
| 2001/0033101 A1 | 10/2001 | Plant | |
| 2004/0124689 A1 | 7/2004 | Numa et al. | |
| 2007/0102987 A1 * | 5/2007 | Chen | A47C 7/282 297/452.56 |
| 2007/0123129 A1 | 5/2007 | Moseneder | |
| 2008/0122284 A1 * | 5/2008 | Yang | A47C 7/282 297/452.56 |
| 2009/0064588 A1 * | 3/2009 | Reid | E06B 9/01 49/50 |
| 2010/0117430 A1 | 5/2010 | Moeseneder et al. | |
| 2010/0187881 A1 | 7/2010 | Fujita et al. | |
| 2010/0259089 A1 * | 10/2010 | Mizobata | B60N 2/7011 297/452.56 |
| 2011/0101165 A1 | 5/2011 | Fullerton et al. | |
| 2011/0278901 A1 | 11/2011 | Fujita et al. | |

OTHER PUBLICATIONS

Extended European Search Report for 14778913.5 dated Oct. 14, 2016.

* cited by examiner

AIRCRAFT SEAT BACK ASSEMBLY

CROSS REFERENCE TO RELATED APPLICATION

This application claims priority under 35 USC §119(e) to U.S. App. 61/808,337 filed Apr. 4, 2013 and titled "Aircraft Seat Back Assembly," hereby incorporated herein by reference.

BACKGROUND

Technical Field

The invention relates to seating arrangements. Particular embodiments relate to seating arrangements for passenger aircraft.

Discussion of Art

A typical passenger aircraft seat has long been designed and constructed with a seat bottom and seat back, both having an upholstered cushion or padding, on either a rigid or flexible seat pan supported by structural frames. The structural frames typically are covered by upholstery or thermoformed plastic closeouts.

Demand for economic efficiency drives a constant search for ways to increase the available passenger space while simultaneously reducing costs and weight. This has led to trying to increase passenger living space by lightening the frames and thinning the cushions or replacing the cushions with padded upholstery covers. It is recognized that it would be valuable to find a way to successfully eliminate the cushion and upholstery, not only gaining living space and reducing weight, but eliminating the cost of complex installation and maintenance of the dress cover.

There have been attempts to replace traditional seats with hammock type suspension seating systems but shortcomings have prevented industry acceptance. Even diaphragm-only seats with familiar structural configurations generally have not been accepted.

SUMMARY OF INVENTION

The Aircraft Seat Back Assembly addresses the need to provide an improved combination of comfort, weight, cost and space with a novel combining of conventional bottom seating with a seat back that utilizes an elastomer mesh diaphragm. By combining current bottom seating concepts with an optimized back seating solution, an acceptable level of features and benefits is provided.

The Aircraft Seat Back Assembly is an assembly to be supplied to an aircraft seat original equipment manufacturer (OEM) as a self-contained, bolt-on, seating product. When installed with a conventional seat bottom, e.g., any of the FAA-approved seat cushions that include a flotation cushion, a unique comfort combination is created that overcomes the negative aspects of previous attempts to use fabric suspensions as the comfort surface for aircraft seating.

The assembly provides the seat back portion of a passenger aircraft seat. The seating support and comfort system is an elastomer mesh type diaphragm used without conventional cushions and dress covers. The use of a mesh diaphragm without cushioning maximizes the space available to the passenger by eliminating the thickness of a cushion or padding. The costs and weight associated with an upholstery cover are eliminated. The diaphragm is supported by a structural frame that has a novel slide-in rear shroud closeout. The frame is designed to remain exposed, showing a decorative finish. This reduces the cost of manufacture and weight of the plastic or upholstery closeouts.

The assembly includes the normal parts that constitute the back portion of the seat. A headrest, video display, fittings for mounting a recline lock or other seat parts can be added to meet customer requirements. Typically these parts are assembled partially or in whole at final assembly of the seat. The inventive design enables the individual back parts to be assembled in a dedicated manufacturing environment into a module, ready to install as a separate and completed component of the overall seat. Installing a completed seat back assembly provides a way for a seat OEM to gain the efficiency of dedicated, detail level manufacturing removed from their final level assembly environment.

A seat back assembly is provided that has been optimized (through design, material selection and specific dedicated manufacturing) for installation on an aircraft seat. The seat back assembly comprises a frame having correct ergonomic geometry, made of lightweight material such as a reinforced composite or aluminum alloy. A diaphragm made of elastomeric seating suspension fabric is mounted and stretched in the frame to form the comfort system and passenger interface. To protect the occupant from impingement by someone behind, the rear of the back frame is closed out by a shroud cover. The shroud cover comprises at least one panel made from thermoformed plastic, technical fabric laminate or reinforced composite, that when installed, resists deflection from ordinary passenger pressures. The shroud cover may be constructed of multiple panels joined by conventional means such as fasteners, adhesives, or Interlocking structures.

The inventive seat back assembly includes novel features that optimize the product for aircraft use. The diaphragm is attached in the frame using a flexible key and integrated bolsters to accommodate higher stretch tensions and maximize support at a given tension. The shape of the bolsters is used as a styling feature. The shape of the frame stretcher members and/or the diaphragm can be chosen to set differing tensions at different parts of the diaphragm. The diaphragm material also can be chosen so that different parts of the diaphragm differently respond to an occupant's body weight. In certain embodiments, the closeout shroud has a unique single piece design to minimize cost. However, a multi-piece shroud may also be used. A novel single panel and channel track installation and mounting system are provided for the shroud.

DETAILED DESCRIPTION

Figure 1:
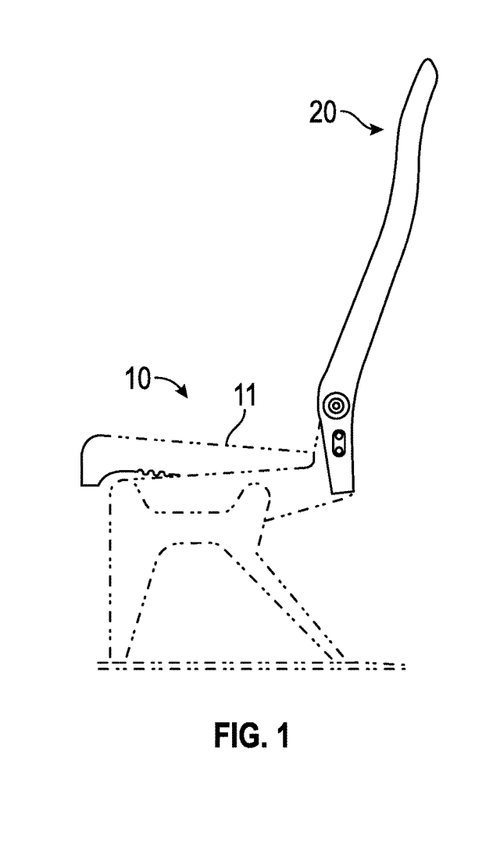
FIG. 1 shows a side perspective view of a seat back assembly, according to an embodiment of the invention, installed in a typical seat configuration.

FIG. 1 shows in phantom a typical aircraft seat frame 10, including an FAA-approved seat cushion 11 (e.g. a flotation cushion), to which is installed by any conventional attachments an Aircraft Seat Back Assembly 20 according to an embodiment of the invention.

Figure 2:
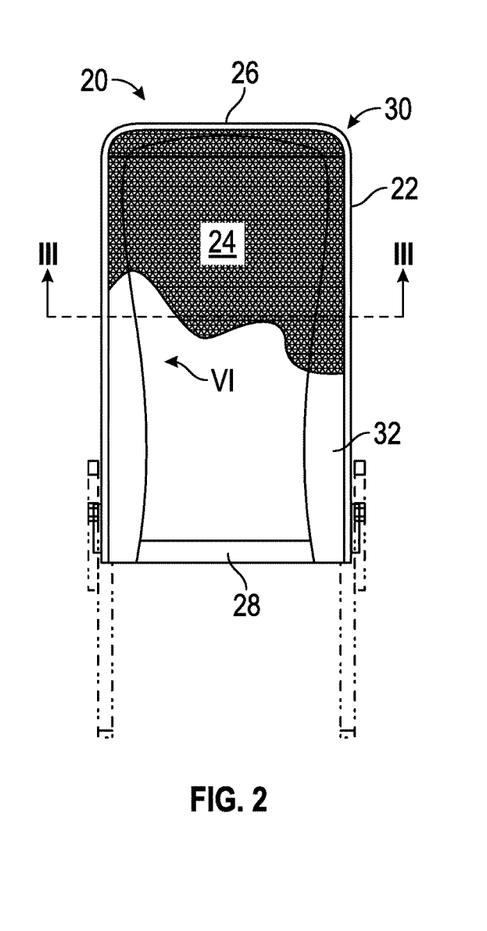
FIG. 2 shows a front perspective view of the seat back assembly shown in FIG. 1, cut away to show arrangement of the bolsters, side members and fabric diaphragm.
Figure 3:
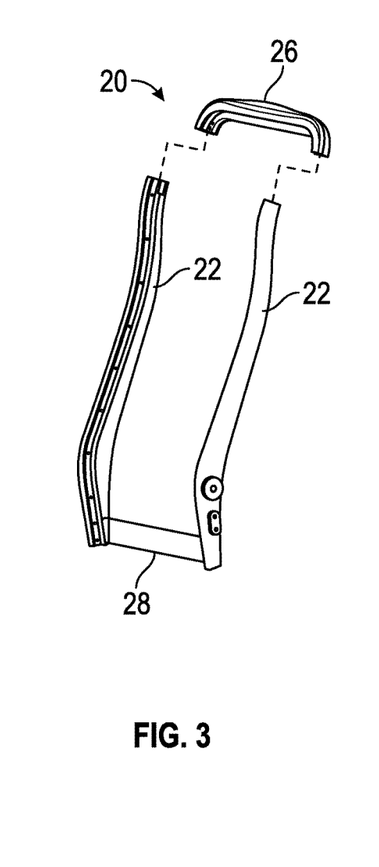
FIG. 3 shows an exploded view of the frame assembly showing the side members, first crossbar and second crossbar.

Referring to FIGS. 2 and 3, an embodiment of the inventive seat back assembly 20 includes two generally vertical side or "stretcher" members 22 that are connected via a diaphragm 24 that is stretched laterally (side to side) between them. The side members 22 are also attached and held apart by a first crossbar 26 and a second crossbar 28. Together, the side members 22 and the crossbars 26, 28 form a frame 30 and termination for the top and bottom ends of the diaphragm 24.

Preferably, the diaphragm 24 is a stretch seating suspension fabric used as the support element of the seat back. The diaphragm 24 may be of any suitable fabric, including for example open mesh, tight weave, or non-woven. Among woven fabrics, a tri-axial weave may be preferred. The diaphragm may be formed as a single piece. In other embodiments, the diaphragm may be a patchwork of anisotropic woven fabric patches, which advantageously can be pieced together with the fabric patches at varied angles to optimize supportive pressures at various locations of an occupant's back.

In a typical embodiment, the diaphragm 24 in its unloaded state is stretched between the side members 22. Additionally, when securing the top and bottom ends of the diaphragm 24 to the frame 30, some additional longitudinal (top to bottom) tension can be applied.

The bottom end of the diaphragm 24 can be terminated in one of many known ways. One example is by sewing the diaphragm 24 to a plastic strip that is then secured to the second crossbar 28. The upper end of the diaphragm also can be terminated in one of many known ways. A manner similar to the bottom termination can be used or another example would be zippering the end of the diaphragm 24 to a separate attachment on the first crossbar 26.

Regarding attachment of the diaphragm 24 to the side members 22, construction methods of furniture such as office chairs include various structures for attaching diaphragms onto seat frames. However, transportation applications such as aircraft seating can require strong diaphragms that are stretched to high tensions. The forces from these high tensions can exceed the practical capabilities of many conventional attachment designs and methods of stretching a diaphragm, especially those intended for multi-directional stretching in office furniture.

Accordingly, this specification discloses novel means for attaching a diaphragm to a seat frame; means that can withstand the forces incurred by aircraft seat applications without resorting to costly special materials or unconventional manufacturing techniques. The disclosed arrangement uses diaphragm tension to control the tightness and positioning of the parts being joined. Thus, the disclosed arrangement differs from known means for attaching a diaphragm to a seat frame, such as enclosing a welt or other type of cord. Also, the disclosed attachment design does not rely on expensive mold tooling to form a bead, carrier or holding device on the diaphragm as do some other known means for attaching a diaphragm to a seat frame. Nor are rivets or screws required as for some other known means for attaching a seat back cushion to a seat frame. Instead, bolsters 32 are integrated into the attachment mechanism to minimize cost and complexity.

Figure 4:
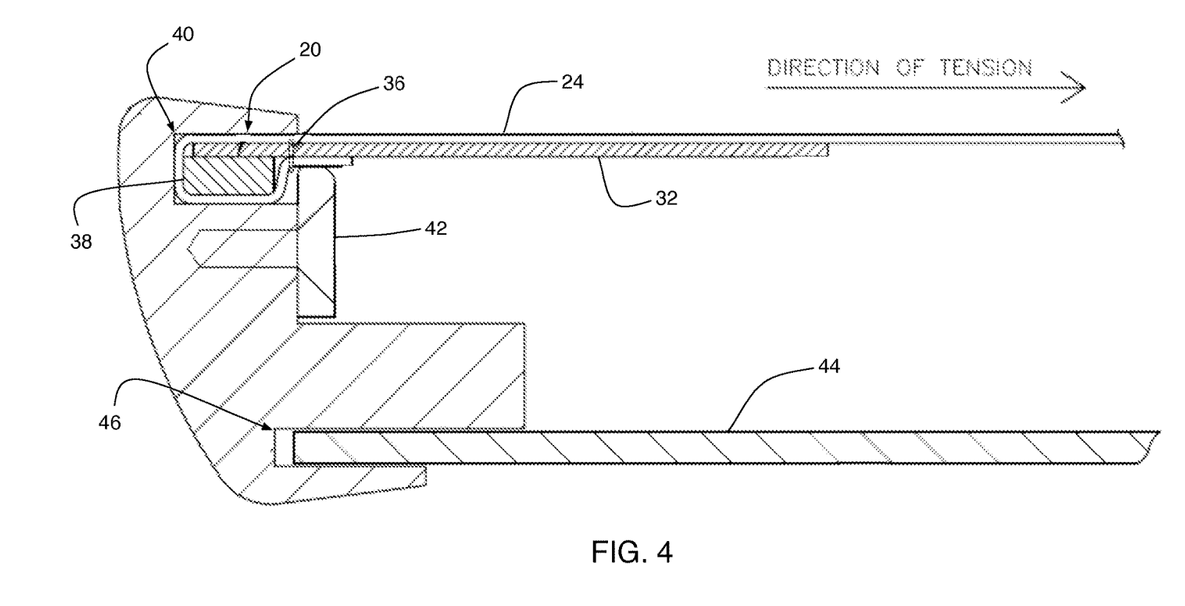
FIG. 4 shows a cross section thru FIG. 2 showing the assembly of the attachment joint.
Figure 5:
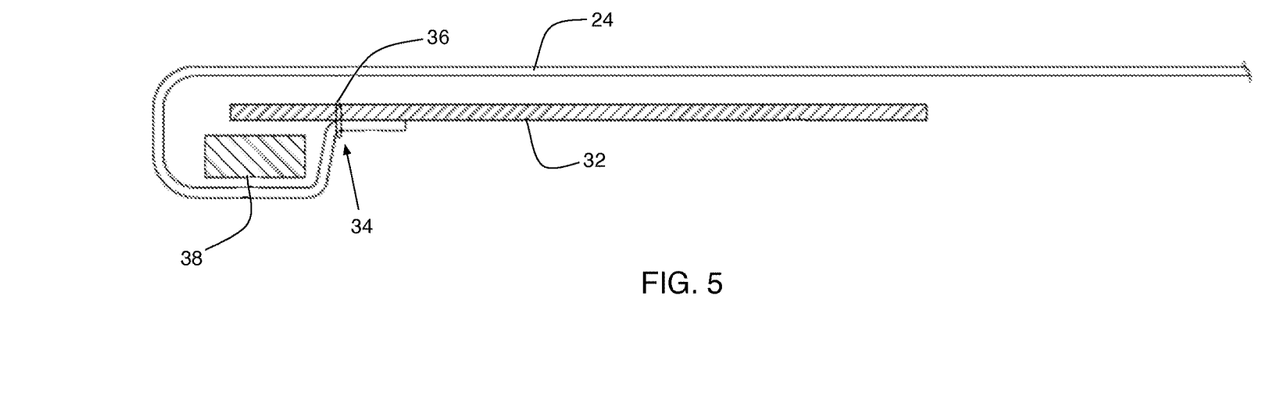
FIG. 5 shows an exploded view of the diaphragm and attachment joint components, prior to being assembled with the side members.

As shown in FIGS. 4 and 5, the bolsters 32 are made integral with the diaphragm 24 by sewing them together and using the resultant seam 34 specifically to provide a locking point for the joint. The seam 34 comprises stitches 36, which attach only one layer of the diaphragm 24 to the bolsters 32. Unlike most conventional seams, the diaphragm 24 is not folded over at the seam; only a single layer of fabric is stitched.

Figure 10:
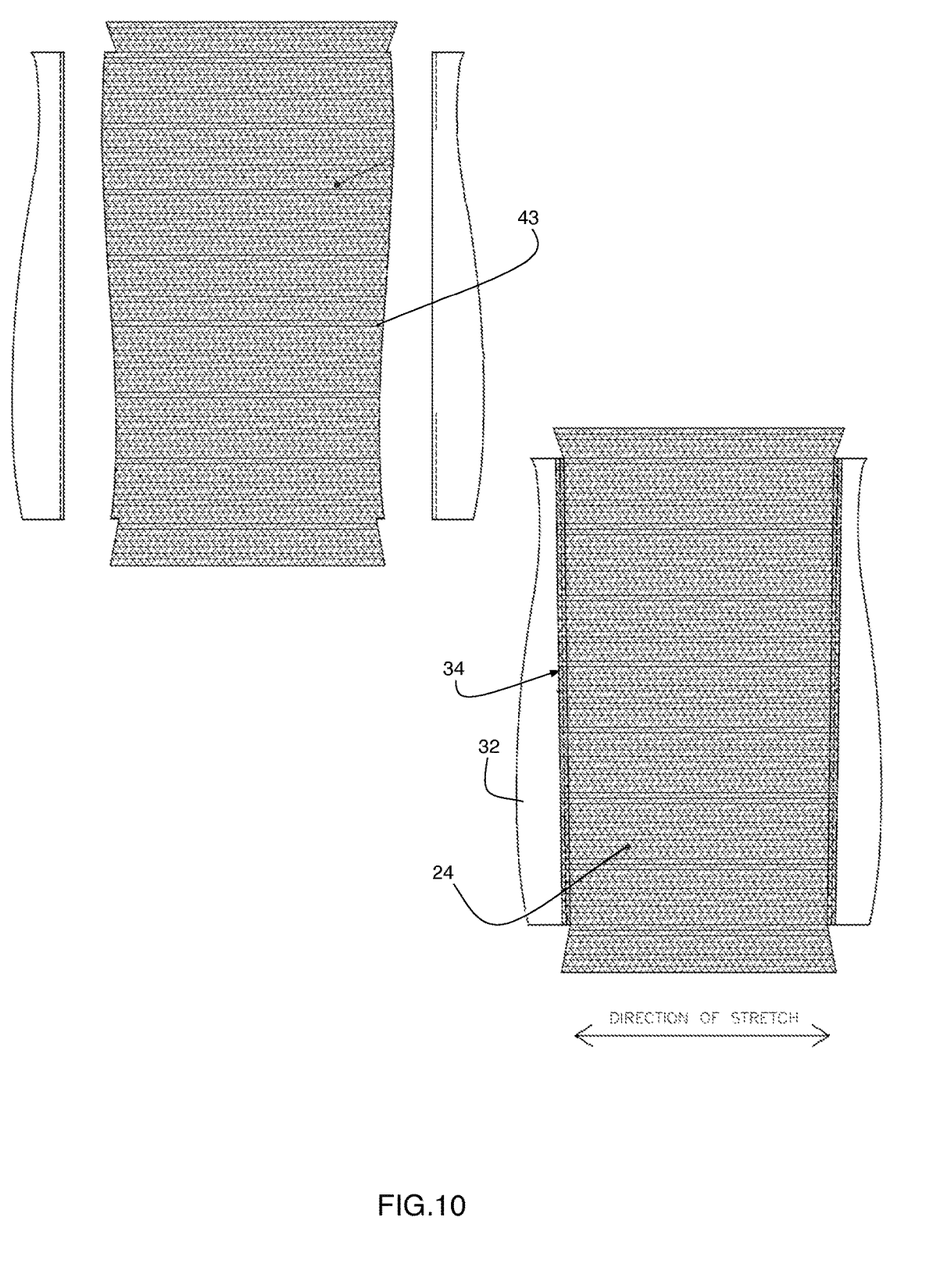
FIG. 10 shows a front view of the bolsters and fabric diaphragm having shaped edges before and after sewing.

Incorporating bolsters 32 into the attachment joint provides for enhancements in both the comfort and aesthetics of the seat, particularly the seat back. The bolsters 32 serve to add support to the diaphragm 24, maximizing effectiveness for a given tension. By varying their shape, the location and amount of support is easily adjusted. They can also serve as a styling element. Their shape is infinitely variable, providing unlimited design opportunities. Although the bolsters 32 are shown in the drawings as being generally flat or of uniform thickness, it is possible to form contoured bolsters of varying thickness. As one example, injection molded foam can be coated with a durable plastic layer to form contoured bolsters for enhanced lower back support. The general effect of contoured bolsters will be similar to that of the diaphragm 24 having curved edges, as shown in FIG. 10. However, bolsters of varied thickness would be expected to augment the variation of supportive tension at varied regions of the diaphragm 24.

Each of the bolsters 32 is attached to its adjacent one of the side frames 22 by engaging the edge of the bolster 32 and a flexible key 38 into a trench-like attachment groove 40, which is approximately rectangular in cross section and runs along the length of the side member 22. The key 38 is captured into the groove 40 by a batten 42, which thereby also captures the edge of the diaphragm 24. As shown in FIG. 3, the side members 22 are arranged such that each groove 40 opens toward the other side frame.

Referring again to FIGS. 4 and 5, the integral bolster 32 is made from thin plastic sheet and cut to a shape that satisfies ergonomic and or styling requirements. The bolsters 32 can be perforated, slotted or otherwise modified to adjust the performance of the bolsters 32 to meet various requirements. The bolster 32 could be a molded part if more complex shapes and varying thickness is desired.

The selvage of the seam 34 is allowed to pass out of the groove 40 between the bolster 32 and the batten 42, in order to prevent the batten 42 from putting a load directly on the seam 34 stitches 36. Instead, the load is carried first by the edge of the key 38 adjacent the batten 42, then by the part of the diaphragm 24 that is wrapped around the key and stretched between the two side members.

The flexible key 38 is a narrow strip of flexible plastic having a rectangular cross section. The key 38 is flexible enough to freely conform to the contour of the attachment groove 40 in the side member 22. The flexible key 38 is sized to move freely within the joint until the diaphragm 24 is brought under tension. Also, the width of the key 38 extends beyond the edge of the bolster 32 when it is positioned at the sewn seam 34. This ensures that tightening the diaphragm 24 will pull the parts together as well as move the assembled parts against a batten 42.

The groove 40 can be formed into the side member 22 by means compatible with the construction of the side member 22, e.g., casting, molding or forming. Alternatively, the groove 40 can be a separate piece, such as a stamping 40a (FIG. 6), or an extrusion or pultruded composite 40b (FIG. 7), which is adhered or fastened in place. This method is suitable for use with fiber reinforced composite constructions of the side member 22.

Figures 6, 7, 8, 8A:
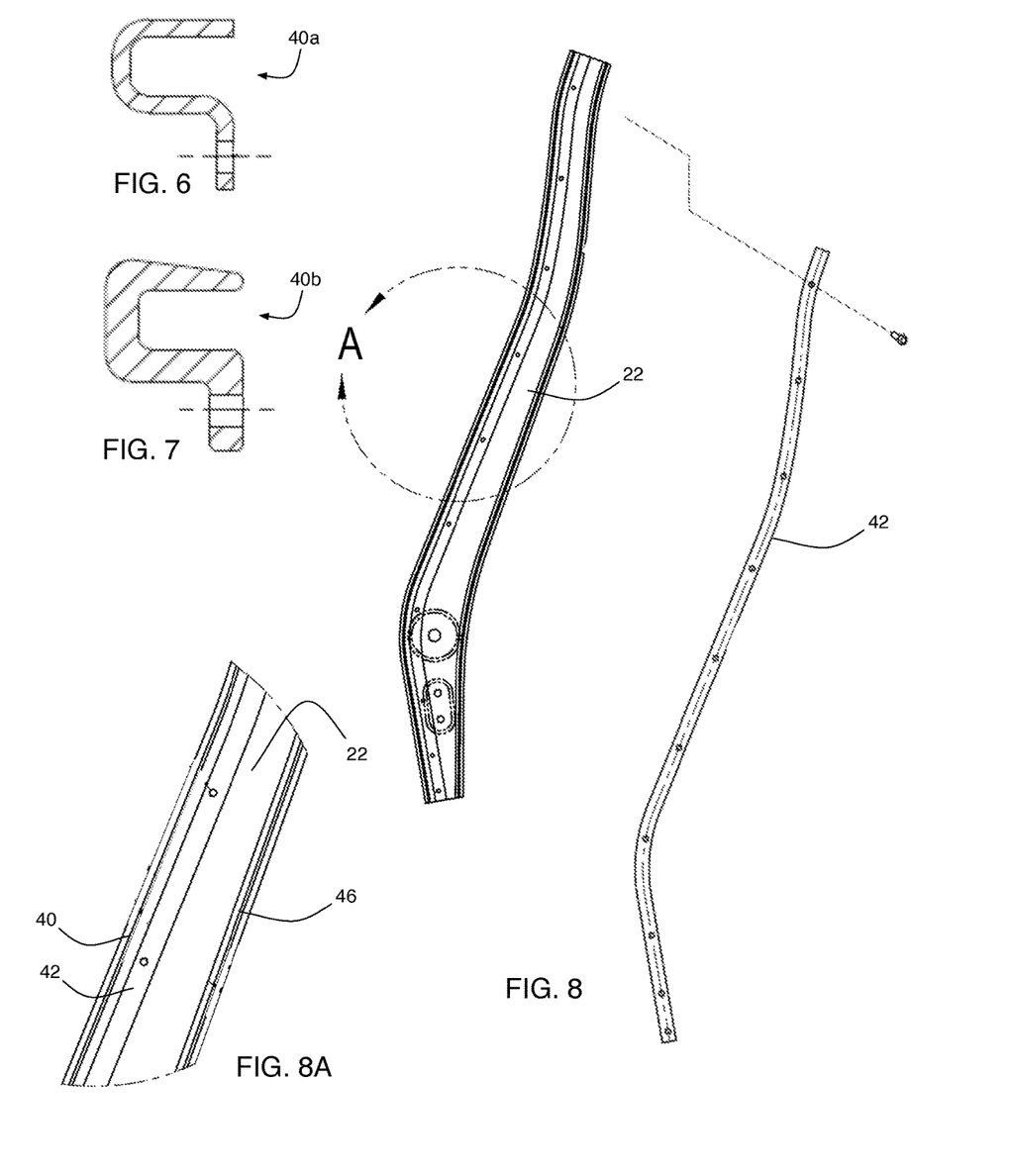
FIG. 6 shows a typical cross section of a stamped metal attachment groove.
FIG. 7 shows a typical cross section of a pultruded or extruded attachment groove.
FIGS. 8 and 8A show an exploded view of a side member and batten, as well as a detail view of an interior face of the side member including an attachment groove and a shroud channel.

Referring to FIGS. 8 and 8A, the batten 42 consists of a strip of metal or plastic sized and positioned to cover the groove 40 opening except for the thickness of the bolster 32 plus two layers of diaphragm 24 wrapped around the bolster. The batten 42 is sized to hold the bolster 32 against the tightened diaphragm 24 and prevent it from deflecting (twisting) away from the seating surface of the diaphragm 24.

The batten 42, which may be metal or plastic or other rigid material, is secured to the side member 22 by fasteners such as screws or blind rivets, or by bonding. The batten 42 acts as a stop by covering enough of groove 40 to prevent the attachment parts from slipping out of the groove 40.

As the diaphragm 24 is tightened, loose fabric is drawn from the joint forcing the flexible key 38 against the seam 34. At the same time the combined parts of the joint (diaphragm 24, flexible key 38, and integral bolster 32) are pulled against the batten 42, thereby compacting these parts to stabilize the joint.

Preferably, the sewn seam 34 should be stressed only in a way that does not damage the stitches 36. This limited stress mode is achieved by the unique arrangement of the parts, in which the flexible key 38 is positioned adjacent to the seam 34 between the integral bolster 32 and the diaphragm 24, which wraps around the key 38 and then over the bolster 32. Having wrapped the diaphragm 24 around the thickness of the flexible key 38, causes the stitches 36 to be loaded in tension. However, next wrapping the diaphragm over the bolster 32 limits the loading on the stitches 36 by reversing the direction of pull and transferring some of the load to the bolster 32 to produce a shear load at the stitches 36. This controlled dividing of the load into shear and tension helps to minimize peak stresses on the stitches 36.

An increase in diaphragm tension draws the flexible key 38 and integral bolster 32 along the groove 40, moving them until the key 38, wrapped with the diaphragm 24 is stopped by the batten 42 which arrests further movement out of the groove. The flat surfaces of the flexible key 38 wedge the edge of the bolster 32 within the groove 40, thereby limiting rolling of the joint under tension. Previously known joints using beads or welts do not have this ability.

Thus, embodiments of the invention provide a joint that integrates bolsters 32 into the attachment of the diaphragm 24 to the side members 22, so that no separate supporting structures are needed for the bolsters. The flats on the flexible key 38, surface of the bolster 32, and the edge of the batten 42 act together to support the bolster 32 keeping it nearly parallel to the surface of the diaphragm 24. The joint formed is squared and maintains the alignment of the bolster 32. In the described version the fabric diaphragm 24 is sewn to the plastic bolster 32 forming a seam 34. These parts can also be fused or bonded, provided a seam similar to sewn seam 34 is produced.

Figure 9:
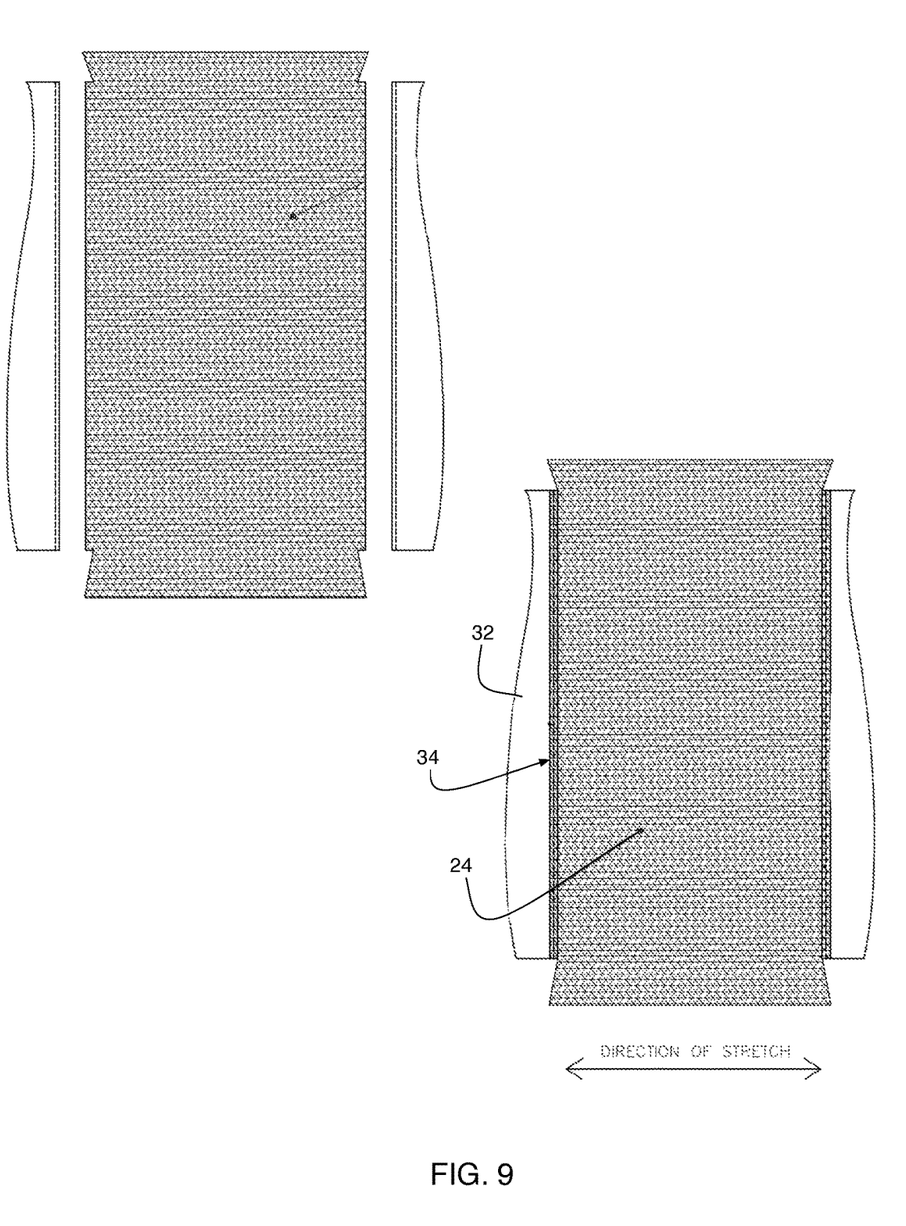
FIG. 9 shows a front view of fabric diaphragm and bolsters before and after sewing.
Figure 11:
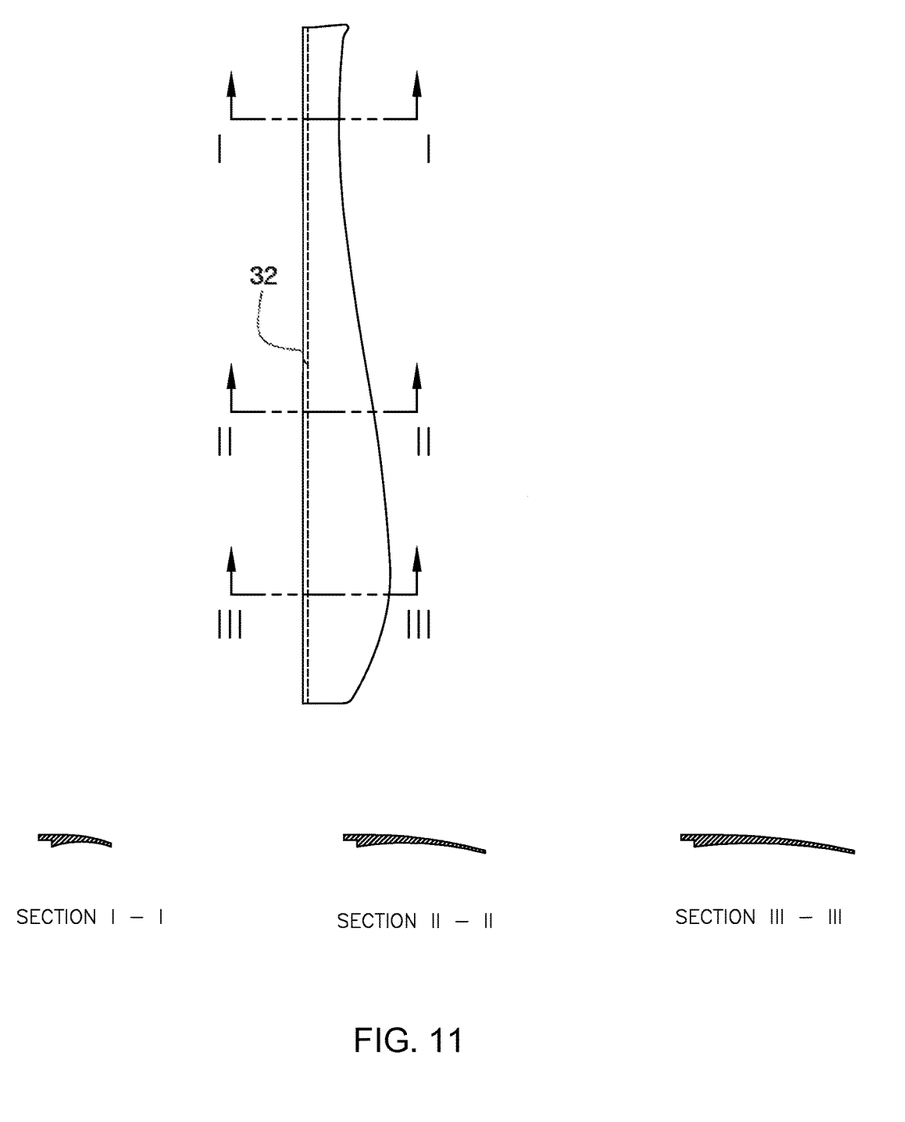
FIG. 11 shows a plan view and several section views of a bolster contoured in thickness.

Turning to FIGS. 9 and 10, in one aspect of the invention a system and method are provided for producing different tensions in various areas of the diaphragm 24 by varying the shape of the diaphragm 24 and maintaining a straight seam 34 (stitch line) when sewing the diaphragm edges to the linear bolsters 32. By using a diaphragm 24 that has straight edges, as shown in FIG. 9, the tension can be kept uniform across the diaphragm. By using a diaphragm that has curved edges 43, as shown in FIG. 10, higher tensions are achieved at narrowed portions of the diaphragm, thereby providing increased support for, e.g., a seated passenger's lower back. Alternatively the bolsters 32 can be contoured in thickness, as shown in FIG. 11, thereby adjusting not only the tension across the diaphragm, but also the firmness of support along the edges of the diaphragm.

Thus, the described attachment design accommodates tensions across the seat back by allowing the component parts of the joint to move in a self-leveling manner. Mobility of the key and bolster within the groove distributes tensioning and prevents local areas of excessive tension that could distort the bolsters 32 or diaphragm 24. This is accomplished by the unique arrangement and proportioning of the attachment parts as discussed above with reference to FIGS. 3 and 4. Both the arrangement and the proportions of the parts being joined are important to achieving the proper movement.

By various other modes, the diaphragm 32 and stretcher members 22 can be configured such that different tensions are provided at different portions of the diaphragm, and/or in different directions across the diaphragm, in response to an occupant's body weight. For example, the stretcher members 22 may be curved toward and away from each other along their length. As another example, the diaphragm 32 may comprise a plurality of woven portions that are rotated with reference to each other, thereby providing different responses to body weight across each portion of the diaphragm. As another example, the diaphragm may be composed of anisotropic fabric, e.g., a triaxial woven fabric. As another example, the diaphragm may comprise a reinforcement layer at a selected portion thereof. The reinforcement layer may extend between the stretcher members across the selected portion of the diaphragm.

In light of the above description of the finished structure, the following describes a method for assembly of an Aircraft Seat Back according to an aspect of the invention.

First, one of the bolsters 32 is sewn to the two long side edges of the diaphragm 24 forming a seam 34 with each bolster 32. Plastic attachment strips (not shown) are sewn to the upper and lower end of the diaphragm 24 to use as upper and lower terminations. A flexible key 38 is wrapped in position along the seam 34 in one of the bolsters 32. That bolster 32 and flexible key 38 are placed into the attachment groove 40 in the corresponding side member 22. The batten 42 is secured to the side member 22 to enclose the flexible key 38 within the attachment groove 40. A second flexible key 38 is wrapped at the seam 34 in the other bolster 32 at the opposite side of the diaphragm 24. This side of the diaphragm 24, bolster 32 and flexible key 38 are then inserted into the attachment groove 40 in its corresponding side member 22, and a second batten 42 is secured to that side member in order to enclose the flexible key 38 in that attachment groove.

Alternatively, the battens can be assembled first, and then the diaphragm-bolster-and-key assembly can be slid into the grooves.

After assembling the diaphragm into the side members, one of the many known ways to tension or stretch a diaphragm is used when attaching the first crossbar 26 and the second crossbar 28 to the side members 22. The two side members 22, with the diaphragm 24 secured in the attachment grooves 40 by bolsters 32, flexible keys 38 and battens 42, are placed in a tensioning jig (not shown) and moved apart to stretch the diaphragm 24 between them. While the two side members are held in position by the tensioning jig, the first crossbar 26 and second crossbar 28 are fastened in place. The lower end of the diaphragm 24 is secured to the second crossbar 28 by fastening the plastic attachment strip sewn to the lower diaphragm. The upper end of the diaphragm 24 is secured to the first crossbar 26 by fastening the plastic attachment strip sewn to that end of the diaphragm 24.

The described structure and method are not intended to exclude other forms or procedures for building an Aircraft Seat Back Assembly according to the invention. For example, the batten 42 could take other forms provided it acts to close off or block the groove 40 sufficiently to retain the key 38. For example, the batten 42 could be a structural part of the side member 22 if the bolster 32 and key 38 were slid lengthwise into the groove 40. The side member 22 could be made up of multiple parts that are combined to form the groove 40 and batten 42. The side member 22 could be shaped to have curves in more than one plane. This would enable the diaphragm 24 to have 3D contours. Other variations may occur to the skilled worker while implementing the embodiments described.

To finish the assembly 20, a shroud may be attached by mounting over the outside of the frame and using fasteners such as screws and panel nuts to hold it in place. Referring again to FIG. 4, the described assembly uses a rear closeout shroud 44, which can be installed by sliding it into channels 46 that run along the length of each of the side members 22. The edges of the shroud panel 44 fit into the channel 46 and are retained by the undulating or recurved shape of the channel 46, which follows the general shape of the side member 22. The inventive method of attachment eliminates exposed edges that must be finished by the upholstery system or otherwise addressed to provide an adequate and aesthetic closeout of the frame. For extra security, screws or rivets or some other type of fastener may be utilized to attach the shroud 44 to at least one of the first crossbar 26 or the second crossbar 28. It is preferred to position the fasteners in a countersunk manner such that they will not catch on luggage or passengers.

Advantageously, providing an aircraft seat back assembly that includes the rearward shroud 44, separated by an air gap from the diaphragm back support 24, synergistically resolves several problems.

First, as aircraft seat rows may be tightly spaced, there is a known problem with knee-strikes against the lower backs of seated passengers. This problem may have been to some extent resolved in prior seat assemblies by providing a rigid pan that supports the foam padding at the back of a conventional aircraft seat. However, in conventional seats the pan is believed to contact the padding in the absence of impact. The conventional construction, combined with the dynamic response characteristic of the foam padding, causes impacts on the pan to be transferred directly through the padding to the seated passenger with only minimal attenuation.

Second, airlines may have attempted to further reduce the knee-strike problem by making the rigid pans sturdier. However, sturdier pans add weight and fuel costs. Moreover, a conventional pan that is sturdy enough to shelter a seated passenger's kidneys, also is sturdy enough to injure a standing passenger's knees.

Accordingly, in an embodiment of the invention a seat back assembly is designed to optimize for a specific application the many variables that affect the possibility of contact between the diaphragm and shroud, such as diaphragm tension, seat width, frame shape, and shroud stiffness. For example, spacing between the shroud and the unloaded diaphragm may vary from about 1.1" near the upper crossbar 26, to about 2.2" near the lower crossbar 28. The edges of the diaphragm 24 may be shaped to tension the lower portion of the diaphragm such that approximately 1.0"-1.5" deflection occurs at an occupant's seat. In a typical prototype, deflection under a standard occupant loading has been about 1.2", leaving a remaining gap of 0.5" or greater between the diaphragm 24 and the shroud 44 in the usual knee strike area. Meanwhile, under a static normal load of about 40 lbs. in the knee strike area, a typical shroud deflects no more than about 0.3". If needed, a shroud can be molded with ribbing (e.g., parallel, gridded, or wavy) to be stiffer without adding weight.

By providing the diaphragm back support 24, separated from the shroud 44 at a distance sufficient to accommodate deflection of the shroud under a standard knee-strike, embodiments of the present invention alleviate the knee-strike problem at reduced weight and cost and with reduced risk of injury to standing passengers.

Thus, exemplary embodiments of the invention provide a seat back assembly comprising a pair of stretcher members; at least one cross member attaching and spacing apart the stretcher members to form a frame; and a diaphragm attached to and tensioned between the stretcher members to form a seat back. For example, the at least one cross member includes a first cross member disposed and attached at upper ends of the pair of stretcher members, and a second cross member disposed and attached at lower ends of the pair of stretcher members. In certain embodiments, third and fourth edges of the diaphragm, substantially orthogonal the first and second edges thereof, respectively are secured to the first and second cross members. In certain embodiments, a shroud extends between the stretcher members at or near rearward edges thereof, and the diaphragm is secured at or near forward edges of the stretcher members, such that an air gap is provided between the diaphragm and the shroud. For example, when the diaphragm and shroud are not loaded by an occupant, the air gap is sufficiently large such that when the diaphragm is loaded by an occupant, a knee strike will not deflect the shroud to contact the diaphragm. In certain embodiments, when the diaphragm and shroud are not loaded, the air gap is sufficiently large such that in case the diaphragm is subject to a design occupant load of no more than about 200 lb., and the shroud is subject to a design impact of no more than about 40 lb., the shroud does not contact the diaphragm. In certain embodiments, first and second bolsters are attached at seams extending along respective first and second opposite edges of the diaphragm; and first and second keys each are captured between a respective first or second bolster and a respective edge of the diaphragm, each stretcher member including a groove for receiving a respective one of the keys, and each edge of the diaphragm being securing by its bolster and key into a respective one of the pair of stretcher members, such that the diaphragm is stretched between the stretcher members. In certain embodiments, the stretcher members and the grooves are curved, such that different regions of the diaphragm exert different tensions in response to an occupant's body weight. For example, the stretcher members and the grooves are curved toward and away from each other.

In certain embodiments, a pair of battens each partially cover one of the grooves to capture the respective key and edge of the diaphragm. In certain embodiments, the diaphragm is folded over each of the first and second bolsters to capture the respective first and second keys adjacent a seam of the diaphragm and the respective bolster. In certain embodiments, each seam is a straight line generally parallel its respective edge of the diaphragm. In certain embodiments, each seam extends at a substantially constant offset along its respective edge of the diaphragm, and runs parallel along a substantially straight edge of its respective bolster, such that in response to an occupant's body weight different regions of the diaphragm exert different tensions. In certain embodiments, each of the bolsters is contoured in thickness, such that different regions of the diaphragm exert different tensions in response to an occupant's body weight. In certain embodiments, the diaphragm comprises a plurality of woven portions that are rotated with reference to each other such that in response to an occupant's body weight different regions of the diaphragm exert different tensions. In certain embodiments, the diaphragm comprises a woven fabric such that in response to an occupant's body weight different regions of the diaphragm exert different tensions. In certain embodiments, the diaphragm comprises an anisotropic fabric such that in response to an occupant's body weight the diaphragm exhibits different tensions in different directions. For example, the diaphragm comprises a triaxial woven fabric. In certain embodiments, the diaphragm comprises a reinforcement layer at a selected portion thereof. For example, the reinforcement layer extends between the stretcher members across the selected portion of the diaphragm. Generally, embodiments of the invention may be configured so that in response to an occupant's body weight the diaphragm exhibits different tensions in different directions or in different regions.

In other embodiments, the invention provides an aircraft seat assembly comprising a seat frame; a cushion seat bottom; and, mounted to the frame above and generally orthogonal the cushion seat bottom, a seat back assembly comprised of a pair of stretcher members, at least one cross member attaching and spacing apart the stretcher members to form a frame, and a diaphragm attached to and tensioned between the stretcher members to form a seat back.

In other embodiments, the invention provides an aircraft seat back assembly comprising: a pair of stretcher members that face each other, that near their forward edges have means for attaching a seat back cushion or means for attaching a diaphragm, and that near their rearward edges define a pair of mutually opposed channels extended along the stretcher members and opened toward each other for receiving a shroud panel; a cross member that attaches and spaces apart the stretcher members to form a frame; and a shroud panel mounted into the mutually opposed channels of the stretcher members.

In other embodiments, the invention provides a seat panel assembly comprising: a pair of stretcher members that face each other; a cross member that attaches and spaces apart the stretcher members to form a frame; a diaphragm attached to and tensioned between the stretcher members to form the seat panel; first and second bolsters attached at seams extending along respective first and second opposite edges of the diaphragm; first and second keys each captured between a respective first or second bolster and a respective edge of the diaphragm; each stretcher member including a groove for receiving a respective one of the keys, and each edge of the diaphragm being securing by its bolster and key into a respective one of the pair of stretcher members, such that the diaphragm is stretched between the stretcher members; and the diaphragm folded over each of the first and second bolsters to capture the respective first and second keys adjacent a seam of the diaphragm and the respective bolster, thereby capturing the diaphragm into the grooves.

Although exemplary embodiments of the invention have been described with reference to attached drawings, those skilled in the art will apprehend various changes in form and detail consistent with the scope of the invention. As one example, although the invention has been described generally with reference to an aircraft seat back assembly, many aspects of the invention equally are applicable to a seat bottom assembly. The invention, therefore, is to be understood as including all reasonable variations on new and non-obvious aspects of the exemplary embodiments, as defined by the appended claims.

What is claimed is:

1. A seat back assembly comprising:
a pair of stretcher members;
at least one cross member attaching and spacing apart the stretcher members to form a frame;
a diaphragm attached to and tensioned between the stretcher members to form a seat back; and
first and second bolsters attached at seams extending along the respective first and second opposite edges of the diaphragm such that the diaphragm wraps around the first and second bolsters so that the diaphragm is in contact with opposite sides of the first and second bolsters, each said seam generally extending along the length of its respective stretcher member,
wherein the diaphragm is secured at or near forward edges of the stretcher members and the first and second bolsters are disposed behind the diaphragm on the face thereof directed toward rearward edges of the stretcher members.

2. The seat back assembly as claimed in claim 1, wherein the at least one cross member includes a first cross member disposed and attached at upper ends of the pair of stretcher members, and a second cross member disposed and attached at lower ends of the pair of stretcher members.

3. The seat back assembly as claimed in claim 2, wherein third and fourth edges of the diaphragm, substantially orthogonal the first and second edges thereof, respectively are secured to the first and second cross members.

4. The seat back assembly as claimed in claim 1, further comprising
a shroud extending between the stretcher members at or near rearward edges thereof such that an air gap is provided between the diaphragm and the shroud.

5. The seat back assembly as claimed in claim 4, wherein when the diaphragm and shroud are not loaded by an occupant, the air gap is sufficiently large such that when the diaphragm is loaded by an occupant, a knee strike will not deflect the shroud to contact the diaphragm.

6. The seat back assembly as claimed in claim 4, wherein when the diaphragm and shroud are not loaded, the air gap is sufficiently large such that in case the diaphragm is subject to a design occupant load of no more than about 200 lb., and the shroud is subject to a design impact of no more than about 40 lb., the shroud does not contact the diaphragm.

7. The seat back assembly as claimed in claim 1, configured such that in response to an occupant's body weight the diaphragm exhibits different tensions in different directions or in different regions.

8. A seat back assembly comprising:
a pair of stretcher members;

at least one cross member attaching and spacing apart the stretcher members to form a frame;

a diaphragm attached to and tensioned between the stretcher members to form a seat back;

first and second bolsters attached at seams extending along respective first and second opposite edges of the diaphragm such that the diaphragm wraps around the first and second bolsters so that the diaphragm is in contact with opposite sides of the first and second bolsters, each said seam generally extending along the length of its respective stretcher member; and first and second keys each captured between a respective first or second bolster and a respective edge of the diaphragm such that the diaphragm wraps around the first and second keys so that the diaphragm is in contact with at least two sides of both of the first and second keys, each stretcher member including a groove for receiving a respective one of the keys, and each edge of the diaphragm being securing by its bolster and key into a respective one of the pair of stretcher members, such that the diaphragm is stretched between the stretcher members.

9. The seat back assembly as claimed in claim 8, wherein the stretcher members and the grooves are curved, such that different regions of the diaphragm exert different tensions in response to an occupant's body weight.

10. The seat back assembly as claimed in claim 8, wherein the stretcher members and the grooves are curved toward and away from each other.

11. The seat back assembly as claimed in claim 8, further comprising a pair of battens each partially covering one of the grooves to capture the respective key and edge of the diaphragm.

12. The seat back assembly as claimed in claim 8, wherein the diaphragm is folded over each of the first and second bolsters to capture the respective first and second keys adjacent a seam of the diaphragm and the respective bolster.

13. The seat back assembly as claimed in claim 8, wherein each seam is a straight line generally parallel to its respective edge of the diaphragm.

14. The seat back assembly as claimed in claim 8, wherein each seam extends at a substantially constant offset along its respective edge of the diaphragm, and runs parallel along a substantially straight edge of its respective bolster, such that in response to an occupant's body weight different regions of the diaphragm exert different tensions.

15. The seat back assembly as claimed in claim 8, wherein each of the bolsters is contoured in thickness, such that different regions of the diaphragm exert different tensions in response to an occupant's body weight.

16. An aircraft seat assembly comprising:

a seat frame;

a cushion seat bottom;

mounted to the seat frame above and generally orthogonal the cushion seat bottom, a seat back assembly comprised of a pair of stretcher members, at least one cross member attaching and spacing apart the stretcher members to form a seat back frame, and a diaphragm attached to and tensioned between the stretcher members to form a seat back; and first and second bolsters attached to the diaphragm at seams extending along the respective first and second opposite edges of the diaphragm such that the diaphragm wraps around the first and second bolsters so that the diaphragm is in contact with opposite sides of the first and second bolsters, each said seam generally extending along the length of its respective stretcher member, wherein the diaphragm is secured at or near forward edges of the stretcher members and the first and second bolsters are disposed behind the diaphragm on the face thereof directed toward rearward edges of the stretcher members.

17. An aircraft seat back assembly comprising:

a pair of stretcher members that face each other, that near their forward edges have means for attaching a seat back cushion or means for attaching a diaphragm, and that near their rearward edges define a pair of mutually opposed channels extended along the stretcher members and opened toward each other for receiving a shroud panel;

a cross member that attaches and spaces apart the stretcher members to form a frame;

first and second bolsters attached to the diaphragm at seams extending along the respective first and second opposite edges of the diaphragm such that the diaphragm wraps around the first and second bolsters so that the diaphragm is in contact with opposite sides of the first and second bolsters, each said seam generally extending along the length of its respective stretcher member, and at least one shroud panel mounted into the mutually opposed channels of the stretcher members.

18. A seat panel assembly comprising:

a pair of stretcher members that face each other;

a cross member that attaches and spaces apart the stretcher members to form a frame;

a diaphragm attached to and tensioned between the stretcher members to form a seat panel;

first and second bolsters attached at seams extending along respective first and second opposite edges of the diaphragm such that the diaphragm wraps around the first and second bolsters so that the diaphragm is in contact with opposite sides of the first and second bolsters;

first and second keys each captured between a respective first or second bolster and a respective edge of the diaphragm such that the diaphragm wraps around the first and second keys so that the diaphragm is in contact with at least two sides of both of the first and second keys;

each stretcher member including a groove for receiving a respective one of the keys, and each edge of the diaphragm being securing by its bolster and key into a respective one of the pair of stretcher members, such that the diaphragm is stretched between the stretcher members; and the diaphragm folded over each of the first and second bolsters to capture the respective first and second keys adjacent a seam of the diaphragm and the respective bolster, thereby capturing the diaphragm into the grooves.

\* \* \* \* \*